United States Patent
Perry et al.

(10) Patent No.: US 11,235,242 B2
(45) Date of Patent: *Feb. 1, 2022

(54) CLOUD-BASED GAME SLICE GENERATION AND FRICTIONLESS SOCIAL SHARING WITH INSTANT PLAY

(71) Applicant: Sony Interactive Entertainment LLC, San Mateo, CA (US)

(72) Inventors: David Perry, Monarch Beach, CA (US); Victor Octav Suba Miura, Foster City, CA (US); Warren Benedetto, Aliso Viejo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,174

(22) Filed: Mar. 6, 2020

(65) Prior Publication Data

US 2020/0206625 A1   Jul. 2, 2020

Related U.S. Application Data

(63) Continuation of application No. 15/904,146, filed on Feb. 23, 2018, which is a continuation of application No. 15/268,430, filed on Sep. 16, 2016, now Pat. No. 9,962,611, which is a continuation of application No. 14/526,472, filed on Oct. 28, 2014, now Pat. No.
(Continued)

(51) Int. Cl.
| | |
|---|---|
| *A63F 13/86* | (2014.01) |
| *A63F 13/537* | (2014.01) |
| *A63F 13/493* | (2014.01) |
| *A63F 13/335* | (2014.01) |
| *A63F 13/00* | (2014.01) |

(Continued)

(52) U.S. Cl.
CPC ............ *A63F 13/537* (2014.09); *A63F 13/00* (2013.01); *A63F 13/245* (2014.09); *A63F 13/335* (2014.09); *A63F 13/493* (2014.09); *A63F 13/50* (2014.09); *A63F 2300/407* (2013.01); *A63F 2300/554* (2013.01); *A63F 2300/572* (2013.01); *A63F 2300/577* (2013.01); *A63F 2300/6018* (2013.01); *A63F 2300/634* (2013.01)

(58) Field of Classification Search
None
See application file for complete search history.

(56) References Cited

U.S. PATENT DOCUMENTS

2007/0296723 A1 * 12/2007 Williams ................ A63F 13/12
345/473

* cited by examiner

*Primary Examiner* — Jason T Yen
(74) *Attorney, Agent, or Firm* — Penilla IP, APC

(57) ABSTRACT

Methods enable creation of a game slice from a game. Plurality of games is provided for presentation on a display device. Each game is identified by an image. Selection activity is detected at the image of one of the games. In response to the selection, game code of the selected game is executed to enable game play of an unlocked game. The selected game is streamed to the display device. User interaction related to the game play is received. A recording of the game play is examined to identify portions of the game for generating a game slice, which are returned in a suggested list for selection. Game slice is generated for a selected portion from the list. A recording of the game play for the game slice is associated as a primary video segment. The game slice and the primary video segment are provided for sharing over a network.

14 Claims, 7 Drawing Sheets

Related U.S. Application Data

9,474,973, which is a continuation of application No. 13/797,900, filed on Mar. 12, 2013, now Pat. No. 8,870,661.

(60) Provisional application No. 61/745,543, filed on Dec. 21, 2012.

(51) Int. Cl.
*A63F 13/245* (2014.01)
*A63F 13/50* (2014.01)

CLOUD-BASED GAME SLICE GENERATION AND FRICTIONLESS SOCIAL SHARING WITH INSTANT PLAY

CLAIM OF PRIORITY

This application is a continuation application under 35 U.S.C. 120 and claims priority from co-pending U.S. application Ser. No. 15/904,146, filed on Feb. 23, 2018, and entitled, "Cloud-Based Game Slice Generation and Frictionless Social Sharing with Instant Play," which is a continuation of U.S. application Ser. No. 15/268,430, filed on Sep. 16, 2016, (since patented as U.S. Pat. No. 9,962,611) and entitled, "Cloud-Based Game Slice Generation and Frictionless Social Sharing with Instant Play," which is a continuation application of U.S. application Ser. No. 14/526,472, filed on Oct. 28, 2014, (since patented as U.S. Pat. No. 9,474,973) and entitled, "Cloud-Based Game Slice Generation and Frictionless Social Sharing with Instant Play," which is a continuation application of U.S. application Ser. No. 13/797,900, filed on Mar. 12, 2013 (since patented as U.S. Pat. No. 8,870,661), and entitled, "Cloud-Based Game Slice Generation and Frictionless Social Sharing with Instant Play," which claims priority under 35 U.S.C. 119 (e), to U.S. Provisional Patent Application No. 61/745,543, filed on Dec. 21, 2012, and entitled "Cloud-Based Game Slice Generation and Frictionless Social Sharing with Instant Play", the disclosures of which are herein incorporated by reference in their entirety.

FIELD OF THE INVENTION

The present invention relates to methods and systems for processing and sharing portions of video games over a network.

BACKGROUND

Description of the Related Art

The video game industry has seen many changes over the years. As computing power has expanded, developers of video games have likewise created game software that takes advantage of the growing computing power. To this end, video game developers have been coding games that incorporate sophisticated operations and mathematics to produce a very realistic game experience.

In addition to accommodating for the expanding computing power, the game developers are also developing online games that increase the interaction between user and the gaming system. The interactive online games provide the ability for a user to interactively play against or with other users over the Internet and capture such interactions. Additionally, with the growing trend in cloud-based computing, the game developers are developing new ways for playing existing legacy games and for developing new games by taking advantage of the increased computing power and increased user interactivity. The cloud-based computing systems may include a remote processing server that executes a game application, and communicates with a local client that can be configured to receive input from users and render video on a display.

It is in this context that embodiments of the invention arise.

SUMMARY

Embodiments of the present invention provide methods and systems for providing access to games over a cloud game network and processing game slices made or defined from larger games or full game titles. It should be appreciated that the present invention can be implemented in numerous ways, such as a process, an apparatus, a system, a device or a method on a computer readable medium. Several inventive embodiments of the present invention are described below.

In one embodiment, a method is provided. The method includes executing a game and receiving user interaction related to game play of the game. A recording of the game play is generated. A game slice is generated in response to selection of a portion of the recording. The generated game slice includes executable code that uses state data collected during game play of the game. The game slice is a playable version that is a subset of the game. In response to a share request, the game slice is shared over a network. The sharing of the game slice enables viewing the portion of the recording of the game play. The sharing of the game slice further enables game play of the game slice.

In one embodiment, the game is executed on a game console or on a game server that is available locally or remotely on a game cloud.

In one embodiment, the sharing is done by providing a link to the game slice on a webpage of a game website, on a cloud game server, in a social media post, or in an interactive post.

In one embodiment, generating a game slice further includes verifying available game slices for the game to determine if the game slice has already been defined for the portion of the game, prior to generating the game slice.

In one embodiment, a game slice is generated by generating artificial intelligence (AI) graphic overlays for including with the game slice. The AI graphic overlays are generated by analyzing the recording of the game play for the game leading up to the portion defined in the game slice. The AI graphic overlays are returned for rendering with the game slice. The AI graphic overlays are passive overlays.

In one embodiment, a selection of the game slice for game play from a first user is detected. In response to the selection, the executable code for the game slice is loaded to enable game play. A second recording for the game slice is generated using the game play of the first user. The second recording is associated with the game slice as a secondary video segment. The secondary video segment for the game slice is shared with other users over the network. The sharing of the secondary video segment includes providing an option for selecting the secondary video segment for viewing, when the game slice is selected.

In one embodiment, a game is streamed to a display device and user interaction related to game play of the game is received. A recording of the game play is generated. The recording of the game play is examined to identify portions of the game available for generating a game slice. The game slice is generated in response to selection of a portion from the identified portions. The generated game slice includes executable code that uses state data collected during game play of the game. The game slice is a playable version that is a subset of the game. In response to a share request, the game slice is shared over a network. The sharing of the game slice enables one or more users to view the selected portion of the recording of the game play. The sharing also enables game play of the game slice.

In one embodiment, the selected portion of the recording of the game play for the game slice is saved as a primary video segment. The sharing includes providing an option for viewing the primary video segment, when the game slice is selected.

In one embodiment, a selection of the game slice by a first user is detected. In response to the selection, the executable code for the game slice is loaded to enable game play. A second recording for the game slice is generated using the game play of the first user and associated with the game slice as a secondary video segment. The secondary video segment for the game slice is shared with other users over the network. The secondary video segment is shared by providing a selection option for viewing the secondary video segment, when the game slice is selected.

In one embodiment, the sharing is done by providing a link to the game slice on a webpage of a game website, or on a cloud game server, or in a social media post, or in an interactive post.

In one embodiment, when a game slice is generated, the game slice is associated with an image that is representative of game content included in the game slice.

The various embodiments define ways for creating the game slices that are shared with other users over a cloud in a frictionless manner by loading executable code of a game on the cloud game network for instant play and providing information related to portions of the game to enable the users of a network, such as cloud game network or a social network, to create the game slice. The game slice provides a sampling of a portion of the game that inherits setup parameters pre-defined for the game or defined for the game during game play. In one embodiment, users are not required to sign up for the game, purchase the game, set-up the game parameters in order to create, play or sample the game slice. Further, the game slice may be shared with other users of a social network by posting a link to the game slice in a newsfeed or social stream. When users access the game slice for play, the executable code of the game slice is loaded and executed on the cloud game network to enable instant play and a rendition of the game slice play is provided on the display of the client device. Alternately, the game slice is provided in the newsfeed or stream of the social network so as to enable the users to directly access and play the game within the newsfeed or stream of the social network. The one or more game plays are recorded to generate primary video segments and posted to the cloud game network for sharing with other users of the network, thereby providing a frictionless access to the game slice of the game stored, loaded and executed on the cloud game network. Additional game plays are used to generate secondary video segments that are also posted to the cloud game network, for example, for sharing with other users of the network.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and systems for processing game slices over a game network. It will be obvious, however, to one skilled in the art, that the present invention may be practiced without some or all of these specific details. In other instances, well known process operations have not been described in detail in order not to unnecessarily obscure the present invention.

Generally speaking the various embodiments describe ways to process game slices of a game over a cloud game network and share the game slices with other users for instant play in a frictionless manner. Each game slice is a portion of the game that is less than an entire part of the game. In some embodiments, the game slices are defined by users during game play. In response to user request for accessing one or more games, a plurality of game slices for the particular game or for a plurality of games are identified and returned in a graphical user interface (GUI) format for rendition on a display of a client device. The information returned for rendition also includes an initial image for each of the plurality of games. User activity proximate at the GUI is monitored. When a passive selection activity is detected proximate to an initial image of a select one of the game, a primary video segment for one of the game slices of the game is rendered.

During the rendering of the primary video segment, if an active selection activity is detected either proximate to the initial image of the game or at the primary video segment of the game slice of the game, an executable code for the game slice is loaded in the cloud game network. The loaded executable code is rendered to enable one or more plays of an unlocked subset of the game defined within the game slice. The one or more plays of the unlocked subset of the game are recorded to define one or more secondary video segments. The secondary video segments are posted to the cloud game network to enable sharing of the secondary video segments for the game slice with other users of the cloud game network or one or more social networks of a user.

Figure 1:
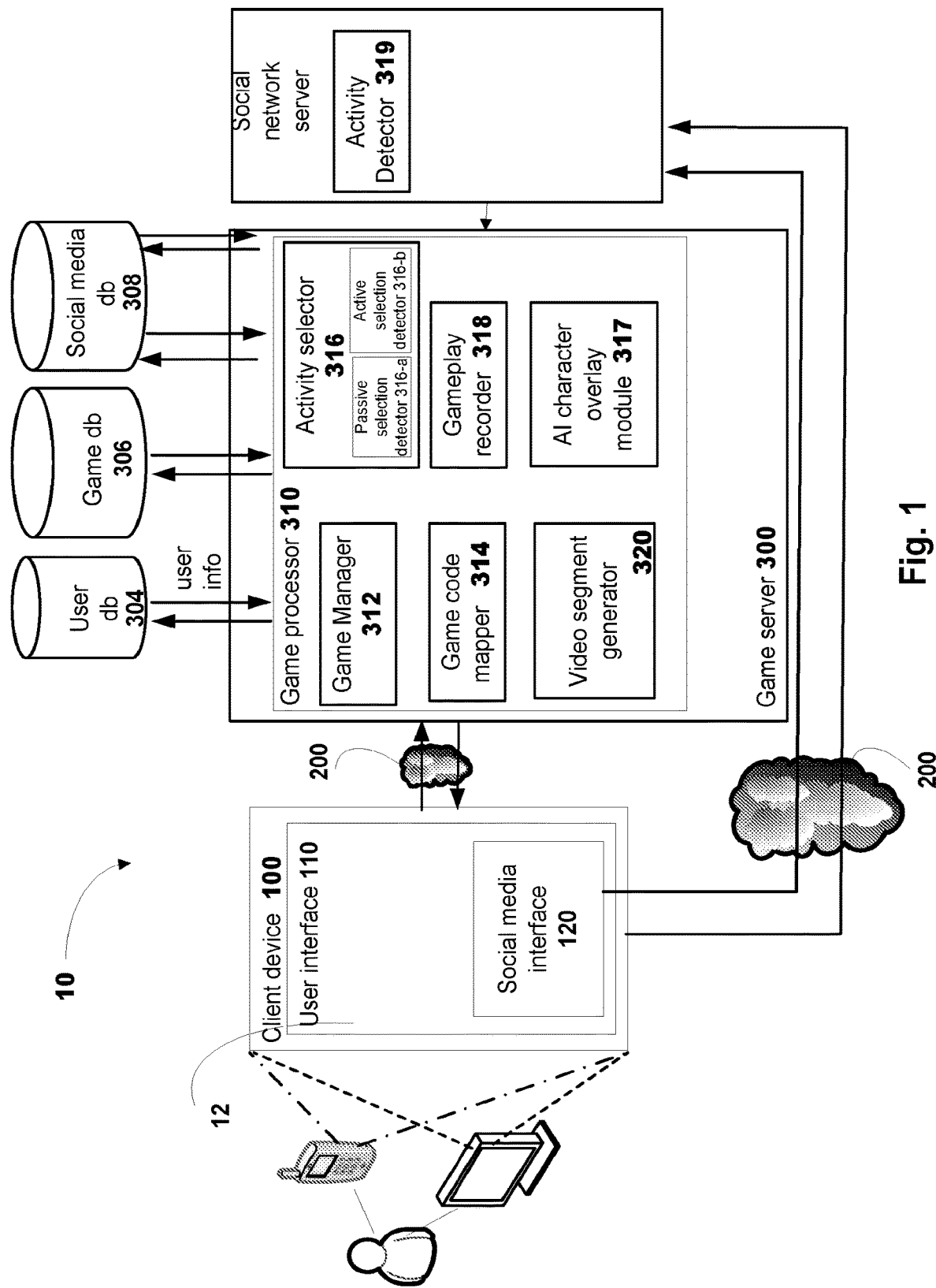
FIG. 1 illustrates a block diagram of a generic system used for processing game slices of a game over a game network, in accordance with an embodiment of the invention.

With the above general understanding of the various embodiments, example details of the embodiments will now be described with reference to the various drawings. FIG. 1 illustrates a system used for processing game slices over a cloud game network, in accordance with an embodiment of the invention. In some embodiments, the cloud game network may include a plurality of virtual machines (VMs) running on a hypervisor of a host machine (or simply a host), with one or more virtual machines configured to execute a game processor module utilizing the hardware resources available to the hypervisor of the host. As shown, the system 10 includes a game server 300 executing the game processor module that provides access to a plurality of interactive video games and associated game slices and a game client 100 for requesting access to games over a network 200, such as the Internet, and for rendering the games/game slices returned by the game server 300 on a display device 12. It should be noted that the game client 100 is any type of computing device having at least a memory and a processor module that is capable of connecting to the game server 300 over the network 200 and for interacting with the game server to execute a rendered portion of the video game/game slice. Some examples of game client device include a personal computer (PC), home theater PC, general purpose computer, mobile computing device, or any other types of computing devices that can interact with the game server to execute a video game. The game server may be any type of server computing device available in the cloud, including a virtual machine executing on a host, and accessed remotely through the network 200.

The game client (or simply "the client") requests access to the games through a user interface 110 provided on a display of the client 100. In some embodiments, the user interface 110 may include a user authentication module to validate a user before servicing a request for providing access to the games from the game network. In response to the request, the game server identifies a plurality of video games and associated game slices, populates a graphical user interface (GUI) with the identified set of plurality of video games and associated game slices and returns the user interface to a client for rendering at the display 12. Each video game may include an initial image associated with it that is representative of the video game. The GUI is populated with the identified video games, associated initial images and returned to the client device for rendering. Each game is associated with a plurality of game slices. In some embodiments, the game slices are defined by users.

In some embodiments, each user defined game slice may include a trigger event, a task to be performed, a sequence of steps or moves, or a challenge to be handled or overcome. In one embodiment, each game slice defined represents a pre-selected portion of the associated game that is less than an entire part of the game. In one embodiment, each of the plurality of game slices of each of the plurality of games may be associated with a primary video segment and a plurality of secondary video segments shared by other users. In another embodiment, some of the plurality of game slices may be associated with a primary video segment but may not have any secondary video segments associated with it. In one embodiment, the GUI generated with the video games and game slices, in response to the request from the client, may provide indicators to identify which of the game slices have one or more secondary video segments associated with it and which of the game slices have no secondary video segments associated with it. The generated GUI of video games and game slices is rendered at the display 12 of the client device 100. The display 12 may be any of type of display that is capable of visually rendering the GUI interface identifying video games/game slices and includes such devices as a monitor or television utilizing any of various types of display technologies, such as LCD, plasma, and DLP technologies. Though not specifically shown, the display 12 may also utilize a projector which projects a GUI image onto a display screen, wall, or other flat surface for viewing.

User activity at the GUI is monitored and analyzed to determine type of activity detected at the GUI. When a passive selection activity is detected proximate to an image of one of the plurality of games, a primary video segment of a game slice of the game is identified for rendering at the display 12 of the client device. In one embodiment, when all the game slices within the game or some of the game slices within the game have primary video segment associated with it, the game slice whose primary video segment is selected for rendering may be based on a selection criterion that is popularity-based on temporal-based. For instance, the game slice selected for rendering the associated primary video segment, may be the popular game slice in the cloud game network or in a social network. Alternately, the game slice selected for rendering the primary video segment may be a newly created game slice, a game slice recently posted for sharing, a game slice posted by a friend of a user, a first game slice in the game, most recently executed game slice in the game, etc. The selection criterion of the game slice whose primary video segment is selected for rendering may be pre-defined in a selection algorithm defined in the game server and used during generation of the GUI returned to the client device.

In some embodiments, the primary video segment may be a recorded play of the game slice that was generated earlier by the user providing the current passive selection activity or may be generated by another user within the game network or social network, and posted to the game server and made available for sharing.

In one embodiment, during the rendering of the primary video segment, further user activities at the initial image of the game or at the primary video segment of the game slice currently rendering at the display, are monitored. When an active selection activity is detected at the initial image of the game or at the primary video segment, an executable code of the game slice associated with the primary video segment is identified and an instance of the executable code is loaded on the game server. The active selection activity, in one embodiment, is provided as inputs in the form of a touch, voice, gesture, one or more taps, one or more clicks, input through a game controller, etc. The above list of inputs are exemplary and should not be considered restrictive. Additional form of inputs that can be provided through the client device may be employed.

In one embodiment, depending on the popularity of the game slice of the game, an instance of the executable code may already be loaded at the cloud game network. In this embodiment, in response to the active selection activity, the instance of the game slice is rendered for instant play. In one embodiment, instant play is enabled by loading the executable code including game objects that are relevant for playing the game slice. The instant play, as used in this application, is defined as the ability to play the game defined within the game slice using the setup parameters that are inherited from an original game play or pre-defined for the game. In one embodiment, the instant play may not require a set-up process for defining the variable parameters but uses pre-defined setup parameters defined for the game thereby addressing some of the latency that are normally associated with conventional game play. In another embodiment, in response to the active selection activity, the instance of the executable code is loaded and rendered for instant play. In this embodiment, a latency is experienced during the loading of the instance of the executable code. In one embodiment, the executable code is loaded and rendered on the virtual machine of the cloud game network. In one embodiment, depending on the popularity of the game slice at the cloud game network or the social network of the user, the instance of the executable code is loaded and rendered on a virtual machine with appropriate bandwidth to provide access for instant play at the client device. For instance, when a game slice is highly popular amongst the users within a social grid of a social network of a user initiating the activities or amongst the users of the cloud game network, a virtual machine with a high bandwidth is selected for loading and rendering the instance of the executable code in the cloud game network so as to provide lower latency and faster access for instant play of the game slice.

Alternately, the executable code of a game slice that is not as popular may be assigned to load and render on a virtual machine with lower bandwidth. Thus, the VMs in the cloud game network are selected to address the network/latency/resource requirements for enabling the users to play the game slice so as to provide an enriching game play experience. Further, the assignments of the VMs are optimized based on the changing demands of the game slices. Thus, when a newly generated game slice with no secondary video segments is accessed for instant play, the executable code of the game slice is loaded and rendered on a VM with lower bandwidth. However, over time, when the popularity of this game slice grows, an instance of the executable code of the game slice may be loaded and rendered on a VM with greater bandwidth. This loaded executable code is made available for users for instant game play.

The executable code, in one embodiment, provides at least minimum functionality to play an unlocked subset of the game defined by the game slice. The executable code, thus, may include all objects or less than all objects of game present in a full version of the game from which the game slices was created. These objects are relevant for instant play of the game defined within the game slice. For instance, the loading of executable code includes loading of game code, game characters, graphic overlays, game objects, object states, object attributes, current state and other game attributes of the game slice that enables playing the game slice. In one embodiment, the game slice may inherit the set-up parameters of the game when the game slice was created by a user. In this embodiment, the game objects, graphic overlays, etc., may inherit the set-up attributes of the game defined by a user when the user played the game and defined the game slice. In another embodiment, the game objects and overlays for the game slice will inherit a set of pre-defined setup parameters. Thus, the executable code of the game slice will enable a user to select a game slice and instantly play the game slice without going through the tedious process of signing-up for the game, buying the game, and/or setting-up the game attributes/options before playing the game defined within the game slice. The various embodiments described herein provide for a frictionless access to a game slice of the game executing on the cloud game network. The game slice is also distributed and accessed by users through one or both of a social network or a cloud game network. The distribution and access through the social network is based on a social relevance defined within a social grid of the social network. Social grid, as used in this application, is defined as a social graph that defines various levels of social connections and relations amongst users within a social network.

In addition to providing at least the minimum functionality, in one embodiment, the executable code may provide information related to pre-defined setup parameters for a type of device used for providing passive and active selection activities. In this embodiment, the type of device used for providing the selection activities is detected and information related to the appropriate pre-defined setup parameters are provided with the executable code. The information may be used to define controls for instant play of the game slice at the client device. The information defining controls may be presented in a pop-up window, a menu, or in any other form at the display of the client device.

In one embodiment, the cloud game network is configured to detect the type of client device associated with a user providing the selection activities, and/or also a type of controller available for the user to provide input to the cloud-based video game. For example, in one embodiment, when a user logs in to the cloud game network, they may be presented with an option to designate the type of client device with which they are accessing the cloud game network. In one embodiment, a series of client device options are presented from which the user may select one corresponding to their client device. Similarly, the user may also be presented with an option to designate the type of controller device they will use to play a video game. In one embodiment, a series of controller options can be presented to the user, from which the user may select to designate a controller type corresponding to their controller hardware. In other embodiments, the cloud game network can be configured to automatically detect the client device type and/or the controller device type.

For example, at the time of login, the client device may send information to the game server identifying itself as well as a connected controller device (e.g. in response to a request from the game server). Based on this information, the game server (i.e., cloud game server) may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device. These configuration and input parameters are used to generate the pre-defined setup parameters.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game and such configurations are provided in the pre-defined setup parameters.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the game server via a network (e.g. accessed via a local networking device such as a router). However, in other embodiments, the controller can itself be a networked device, with the ability to communicate inputs directly via the network to the game server, without being required to communicate such inputs through the client device first. For example, the controller might connect to a local networking device (such as the aforementioned router) to send to and receive data from the game server. Thus, while the client device may still be required to receive video output from the cloud-based video game and render it on a local display, input latency can be reduced by allowing the controller to send inputs directly over the network to the game server, bypassing the client device.

In one embodiment, a networked controller and client device can be configured to send certain types of inputs directly from the controller to the game server, and other types of inputs via the client device. For example, inputs whose detection does not depend on any additional hardware or processing apart from the controller itself can be sent directly from the controller to the game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game server. These might include captured video or audio from the game environment that may be processed by the client device before sending to the game server. Additionally, inputs from motion detection hardware of the controller might be processed by the client device in conjunction with captured video to detect the position and motion of the controller, which would subsequently be communicated by the client device to the game server. It should be appreciated that the controller device in accordance with various embodiments may also receive data (e.g. feedback data) from the client device or directly from the game server.

In one embodiment, each of the plurality of game slices are sharable with one or more users. The instance of the executable code of the game slices may provide minimum functionality to enable instant play of the game slice by the other users depending on the type of device selected by the other users for game play of the selected game slices. Information regarding game plays of the selected one or more of the game slices including passive and active selection activities at the game slice are captured and stored in the cloud game network. The game play information is used in generating a suggested list of one or more game slices to play, for users, based on the stored information of game play and social relevance of the users initiating the sharing and initiating the playing of the game slices. For instance, if users 1, 2, 3 each play a game slice GS1 of game 1, and user 4 has a social relation with one or more of users 1, 2, 3, then user 4 may be presented with game slice GS 1 in the GUI when the user 4 accesses the game system or in a feed within a social network of user 4. The suggested list of game slices presented to the users in the GUI are also organized in a pre-defined ranking order. In one embodiment, the suggested list is organized game slices is based on the social relevance of the users defining the popularity of the game slices to the user requesting access to the game slices.

In one embodiment, the active selection activity causes the suspension of the currently rendering primary video segment and loading of an instance of the executable code at the cloud game network. The loaded executable code is rendered at the cloud game network and a rendition of the game is provided at the display of the client device to enable playing of an unlocked subset of the game defined within the game slice. During the playing of the unlocked subset of the game, the game play is recorded. The recorded game play is used to generate secondary video segments. The secondary video segments are posted to the game server and are made available for sharing.

To assist in the processing of the game slice at the game server 300, a game processor module 310 is provided. The game processor module 310 is configured to execute on the game server 300 and includes a plurality of modules that interact with one another and with the client device to assist in the processing of the game slices and to provide the primary and secondary video segments of game slices over a cloud game network. Some of the modules within the game processor 310 include a game manager module 312, a game code mapper 314, an activity selector 316, a gameplay recorder 318, and a video segment generator 320. In addition to the above listed modules, the game processor module 310 may also include an AI character overlay module 317. The above list of modules is exemplary and should not be considered restrictive. Fewer or additional modules may be provided in the game processor module for processing the game slices, in various embodiments of the invention.

The game manager module 312 is configured to identify a plurality of games and plurality of game slices for rendering at the client device. The game manager module 312 receives a request for game access from a client device. In response, the game manager module 312 identifies the plurality of games and game slices and generates a graphical user interface (GUI) for presenting the games and game slices at a client device. In one embodiment, the game manager module 312 interacts with a user database 304 to determine the user's attributes including user's preference of the type or genre of games in order to identify the games and game slices for rendering and interacts with the game database 306 to retrieve the identified plurality of games and game slices based on the user's preference. In another embodiment, the games and game slices may be identified based on what is popular within anyone or both of the game network and/or the social network of a user from whom a request for the games is received. In this embodiment, the game manager module 312 interacts with a social media database 308 and/or game database 306 to identify the games/game slices that are popular within the social media network and/or the cloud game network and retrieves the games/game slices based on the information obtained from the social media network and/or cloud game network. The retrieved plurality of games and game slices are presented in the GUI returned to the client for rendering. In one embodiment, the cloud game network (or simply a "game network") is part of a cloud system that includes a collection of virtual machines running on a hypervisor of a host with one or more virtual machines configured to execute a game processor module using hardware resources available to the hypervisor.

In one embodiment, the game manager module 312 may also include a ranker module 312-a. The ranker module 312-a organizes the identified plurality of games and game slices based on a pre-defined ranking order defined within when generating the GUI and returns the organized games and game slices to the client device for rendering at the display 12. In one embodiment, the ranker module may determine the popularity of the game in the social network/game network and organize the game/game slices based on the popularity. In another embodiment, the organization may be based on different a pre-defined ranking criterion.

Figure 2:
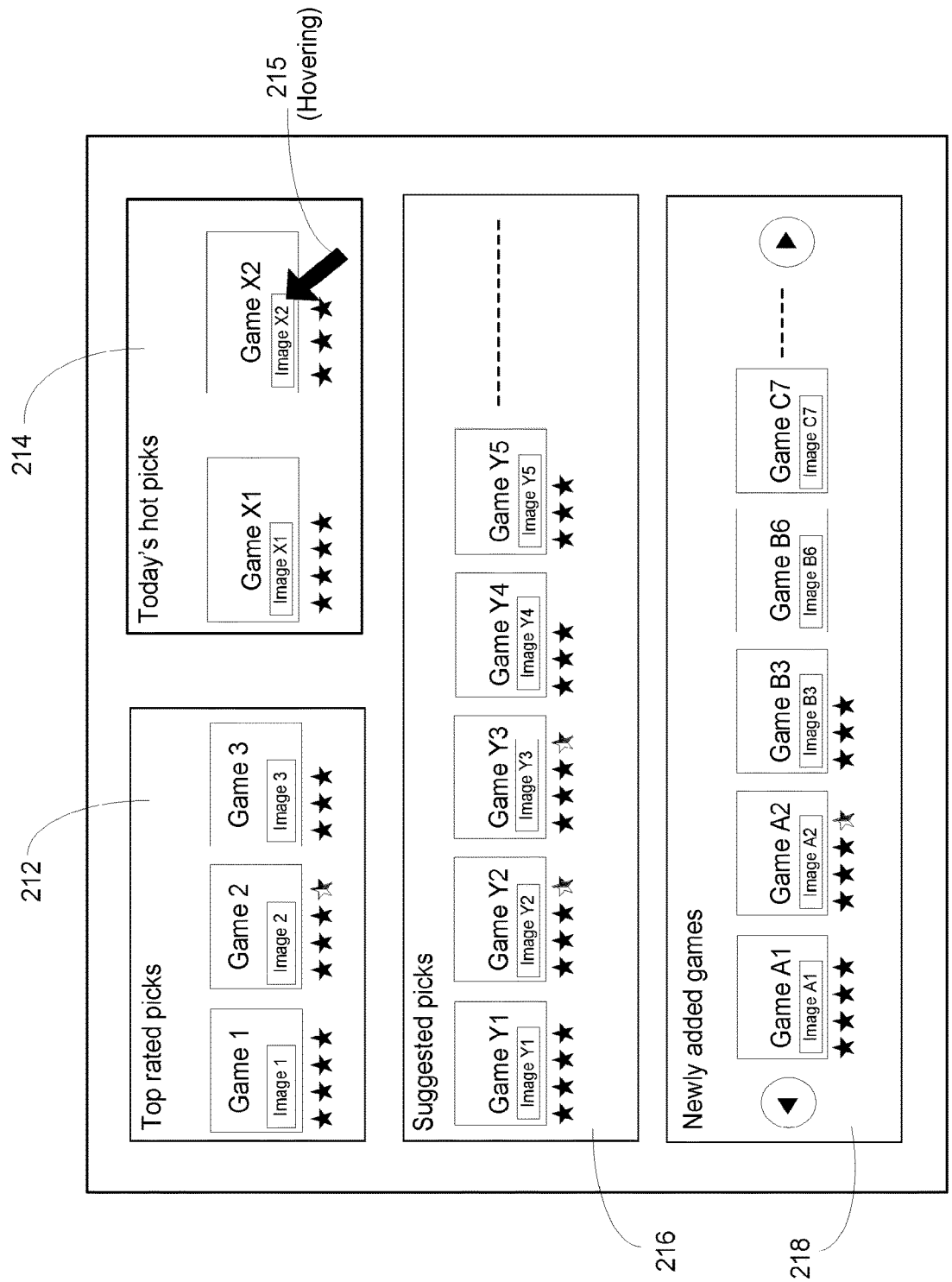
FIG. 2 illustrates a user interface rendering the plurality of games and plurality of game slices, in accordance with an embodiment of the invention.
Figure 3:
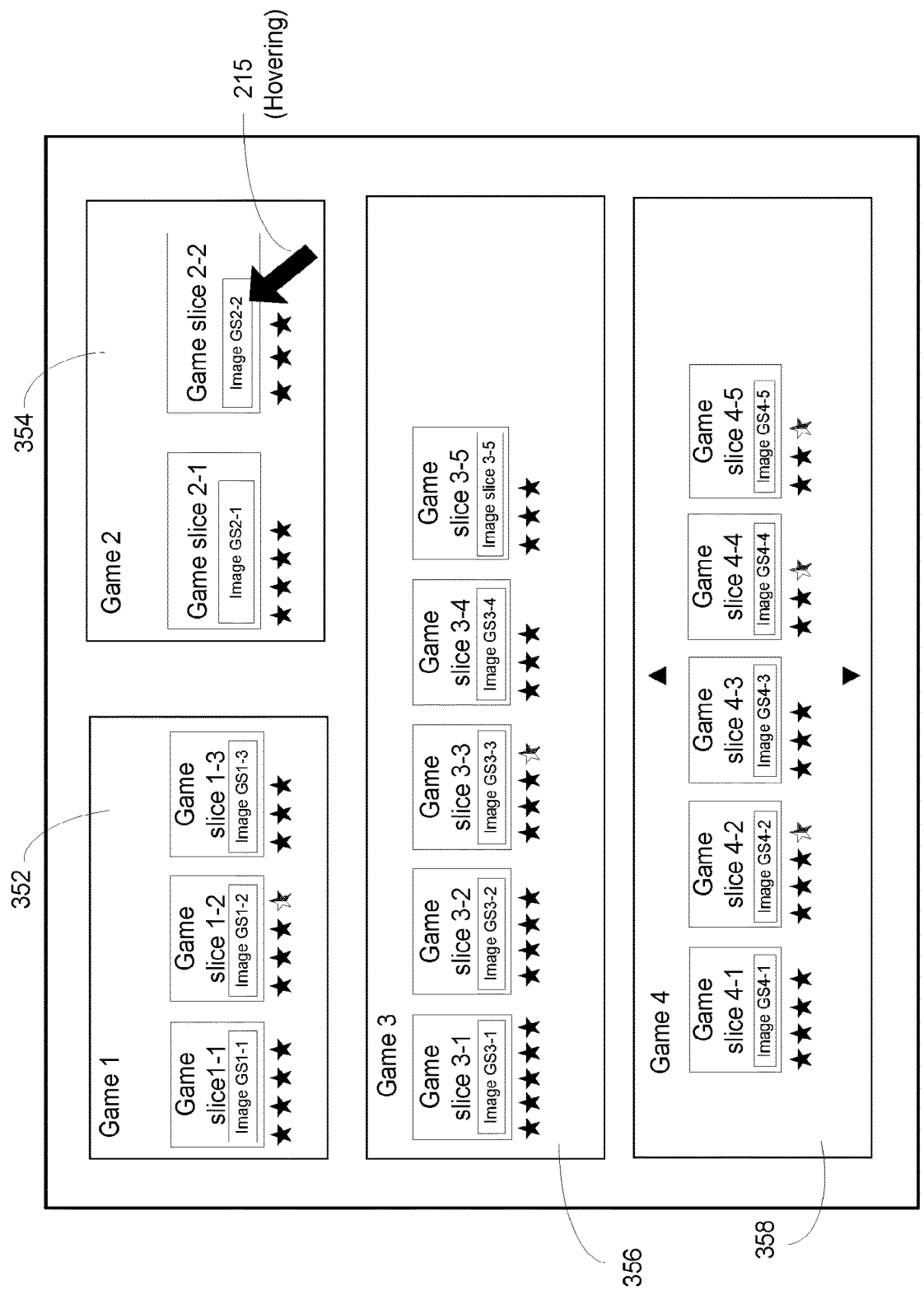
FIG. 3 illustrates an alternate embodiment of the user interface rendering the plurality of games and game slices illustrated in FIG. 2.
Figure 4:
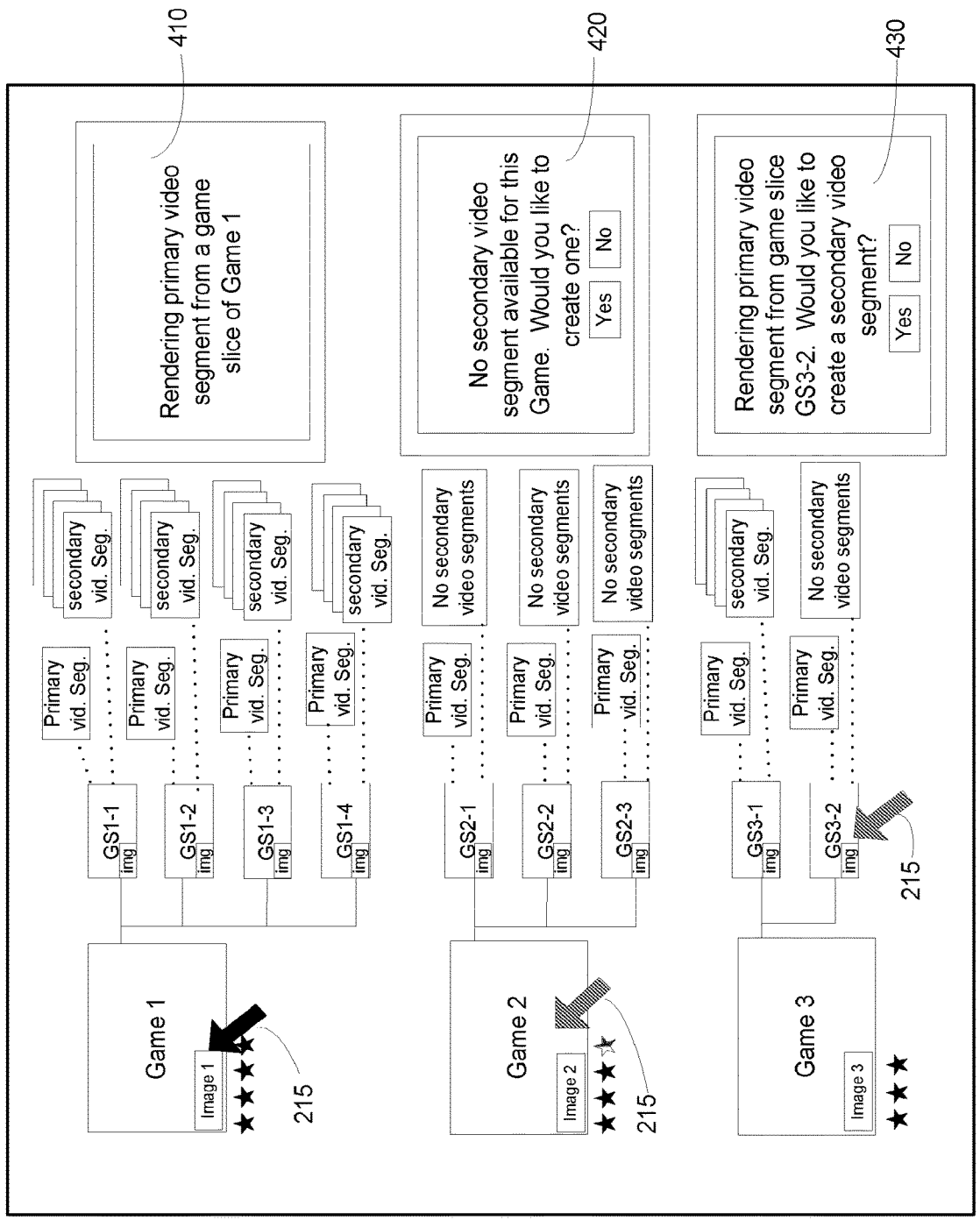
FIG. 4 illustrates an alternate embodiment of the user interface rendering the plurality of games and game slices illustrated in FIGS. 2 and 3.

FIGS. 2, 3 and 4 illustrate the various representation of GUI generated by the game manager module 312 returned to the client for rendering based on the user preferences and/or based on information obtained from the game network/social network. In one embodiment as illustrated in FIG. 2, the game manager module 312 identifies the various games that are popular or highly rated within the game network/social network and generates the GUI with the identified games organized in a ranking order of popularity. In one embodiment, the games/game slices returned in the GUI are organized into categories. FIG. 2 illustrates a sampling of the various categories into which the games are organized by the ranker module 312-a within the game manager 312.

Figure 2A:
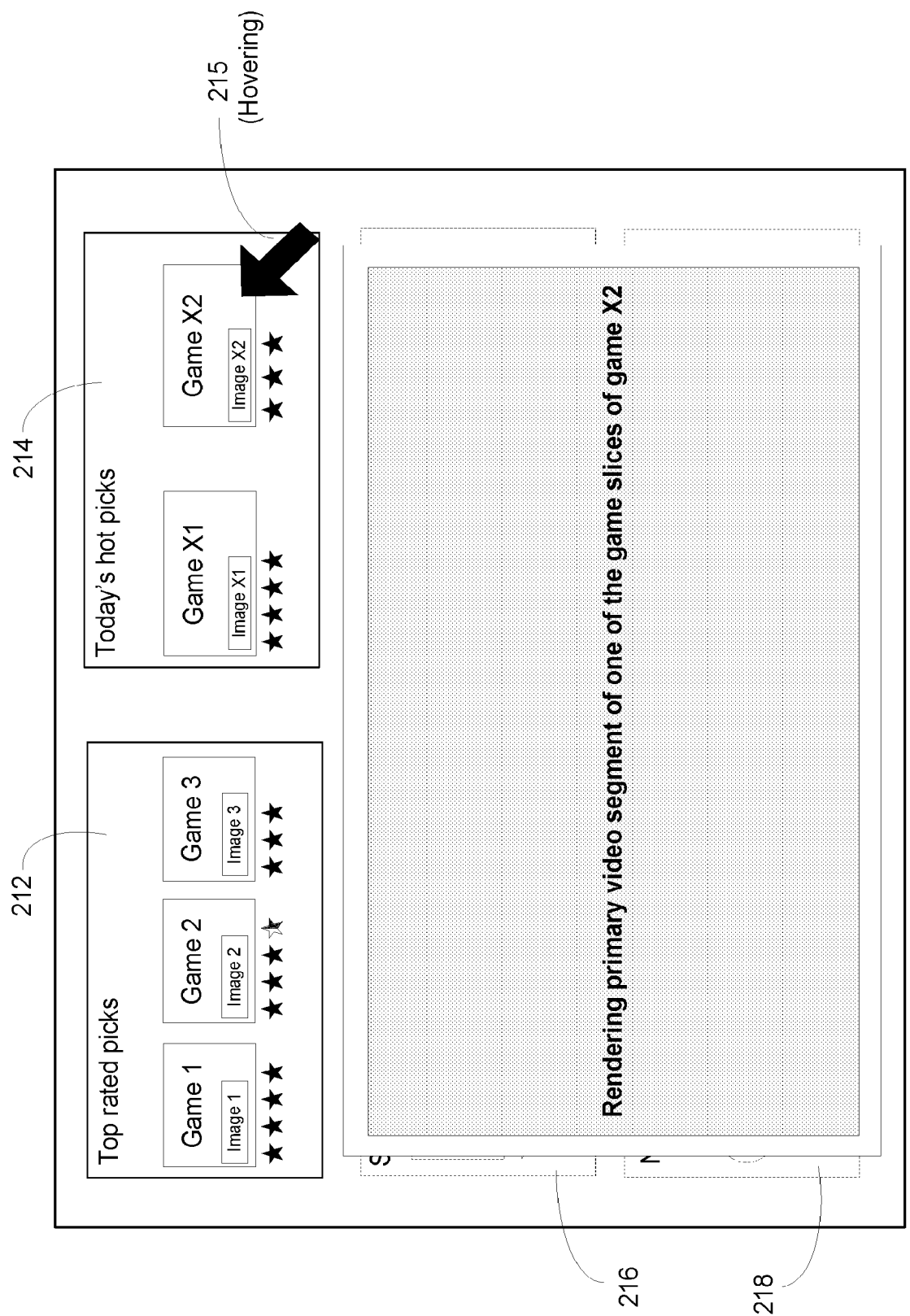
FIG. 2a illustrates a user interface rendering a primary video segment of a game slice of the game, in response to passive selection activity, in accordance with an embodiment of the invention.

The categories used to organize the games, such as "top rated picks" 212, "today's hot picks" 214, "suggested picks" 216, "newly added games" 218, etc., are exemplary and should not be considered restrictive. Additional, fewer or different ways of organizing the games may be employed. As illustrated in FIG. 2, each game presented in each category may include a rating indicator to identify the relative rating/popularity of the game within each category as established within the game network. It should be noted herein that each game/game slice is associated with an initial image that is representative of the game and/or game slices, and the game manager module 312 includes these initial images when presenting the games/game slices within the GUI. In the embodiment illustrated in FIG. 2, the GUI is configured to render only the games and not the game slices associated with each game. As a result, the GUI returned for rendering includes the games and an initial image for each game. When a selection activity, such as a passive selection activity 215, is detected proximate to the initial image of a game, a primary video segment of a game slice is selected for rendering at the display as a full or partial overlay over the GUI, as illustrated in FIG. 2a. The user input defining passive selection activity 215 may be of any form of user input including "hovering over" the initial image of a game/game slice, mouse-over, finger action, touch, voice, arrow keys, controller keys, single click, double click, single tap, double tap, gestures (e.g., single finger, multi-finder or multi-hand), or any other user input device/control actions provided through the client device. Alternately, in response to the passive selection activity 215, the primary video segment may be rendered as a pop-up window. The overlay or pop-up window rendering are exemplary and should not be considered restrictive. Other ways of rendering the primary video segment may be adapted. Details about the selection activity will be discussed in greater detail with reference to the activity selector module 316.

FIG. 3 illustrates another representation of GUI organized and returned by the game manager module 312, in one embodiment. In this embodiment, a representative set of game slices or a complete set of game slices for each game are organized under the respective games and returned for rendering at the client device. Each game slice is associated with an initial image that is representative of the game slice.

As illustrated in FIG. 3, game slices for game 1 are organized within box 352 and include game slice 1-1, game slice 1-2, game slice 1-3, game slice 1-4. Similarly, game slices for game 2 are organized within box 354, game slices for game 3 within box 356, etc. When a selection activity, such as a passive selection activity 215, is detected proximate to an initial image of a game slice, a primary video segment of the game slice is rendered at the display, in one embodiment. For instance, as illustrated in FIG. 3, the primary video segment associated with game slice 2-2 will be selected for rendering in response to the passive selection activity proximate to the image GS2-2. In this embodiment, the primary video segment may be overlaid over the GUI presenting the games. In another embodiment, the primary video segment may be presented in a different window or in a pop-up window, etc.

In yet another embodiment, the video games and available game slices are organized in the GUI as illustrated in FIG. 4. In this embodiment, the game slices for each game may be associated with primary video segments and may or may not be associated with any secondary video segments. The GUI generated by the game manager module 312 provides additional indicators to indicate availability of the different video segments. As illustrated in FIG. 4, game 1 includes 4 game slices, GS1-1, GS1-2, GS1-3, GS1-4, with each game slice having a primary video segment and a plurality of secondary video segments. Game 2 includes game slices GS2-1, GS2-2, and GS2-3 with each of the game slices having a primary video segment and no secondary video segments associated with it and game 3 includes game slices GS3-1 and GS3-2 with each game slice GS3-1 including a primary video segment. However, game slice GS3-2 does not have any secondary video segments while game slice GS3-1 includes a plurality of secondary video segments associated with it. In one embodiment, the number of secondary video segments may be representative of the popularity of the game slice within a social network and/or the game network. In this embodiment, when a passive selection activity is detected at game 2 or at any of the game slices of game 2, the game manager module will render the primary video segment of a corresponding game slice of game 2. Additionally, the game manager module may interact with other modules, such as activity selector and video segment generator to provide an interface and controls to enable generation of secondary video segments for the game slice, as illustrated in box 420. Alternately, when a passive selection activity is detected at game slice GS3-2 of game 3, appropriate primary video segment from game slice 3-2 will be rendered with option to generate one or more secondary video segments, as illustrated in box 430. Similarly, when a passive selection activity is detected at game 1, primary video segment of any one of the game slices will be rendered, as illustrated in box 410. The selection of the game slice for which the primary video segment is rendered may be defined based on a selection criterion available to the activity selector. Boxes 410, 420, 430 may be overlays, pop-up windows, or rendered on a separate window at the user interface of the display of the client device.

Returning to FIG. 1, the GUI with the games and game slices are returned by the game manager 312 to the client device 100 for rendering on the display 12. User activity at the GUI is monitored by the activity selector module 316. The activity selector 316 includes a passive selection detector 316-a and an active selection detector 316-b. When a passive selection activity is detected at the game or at one of the game slices of the game, the passive selection detector 316-a within the activity selector 316 is triggered in response to the detection. The passive selection activity proximate to an initial image of the game or initial image of the game slice of the game may be, as described above, in the form of a hover 215, a mouse-over, etc.

In one embodiment, the games and game slices defined in the GUI may be accessed at the client device through a social network of a user. In this embodiment, the selection activity at the games may be detected using an activity detector 319 at the social network server and transmitted to the activity selector 316 for processing. The activity selector 316 analyzes the selection activity to determine if the selection activity is a passive selection activity or an active selection activity and triggers the appropriate selection detector 316-a or 316-b. When a passive selection activity is detected, the passive selection detector 316-a identifies a primary video segment associated with a game slice of the game for rendering. The game slice of the game selected for rendering the primary video segment may be one of the game slice that is selected based on ranking criteria (i.e., the most popular game slice of the game), a recently created game slice, first game slice generated for the game, first game slice generated by a user that provided passive selection activity, or a game slice that is popular within a social network of the user, to name a few. The primary video segment is returned to the client device for rendering at the display 12.

In response to receiving the primary video segment (when available) at the client device, the primary video segment is rendered at the display 12. In one embodiment, during the rendering of the primary video segment, additional user interactions are monitored at the primary video segment. When an active selection activity is detected by the activity selector module 316 at the primary video segment, the activity selector module 316 triggers the active selection detector 316-b. The active selection detector 316-b interacts with the game code mapper to identify executable game code for the game and the game slice associated with the primary video segment and loads an instance of the executable game code to the game server.

The game code mapper is configured to map the executable game code for the game and for each of the game slices of the game from the game database 306. As a result, the game code mapper returns an instance of the mapped game code associated with the game slice and one or more components/objects required for rendering the game slice, in response to the request from the active selection detector 316-b. The returned game code includes server-side code and the client-side interface. The server-side code is loaded onto the game server and the client-side interface is returned to the client device for rendering. The loading of the executable game code causes loading of the game code, game characters, game objects, game object attributes, game attributes, current game state data, game object state, graphic overlays, etc., on the game server. The loaded executable code represents an unlocked subset of the game within the game slice for which the primary video segment is rendered. An instance of the executable code of the game slice is loaded onto a virtual machine server based on the popularity of the game slice within the game network and/or a social network. For example, the game slice that is most popular may be loaded onto a virtual machine with greater bandwidth than the game slice that is less popular so as to provide access to play the game slice without much latency. In some embodiments, based on the popularity of the game slice, the instance of the executable code may be pre-loaded onto a virtual machine server and access provided as and when needed to minimize the latency for playing the game slice.

Each game play of the unlocked portion of the game defined within the game slice is recorded using the gameplay recorder module 318. The game play includes user activities and user inputs at the game slice. The recorded game play of the unlocked portion of the game, in one embodiment, is used to generate secondary video segments using a video segment generator 320. The generated video segments, i.e., secondary video segments, are posted to the game database in the game server for sharing with other users of the game network or with other users of a social network associated with a user that provided the selection activity at the game slice.

In one embodiment, the game slice generator 322 will interact with the AI character overlay module 317 to determine the character and graphic overlays required for the game slice. The AI characters with the AI character overlay may not be part of the original game code of the game slice but is added by the AI overlay module to make the game slice look more realistic and as close to the original portion of the game from the which the game slice was defined as possible.

In one embodiment, in order to determine the AI character overlay, the AI character overlay module 317 will look up the game sequence of a plurality of game plays for the game slice to determine various outcomes and generate the AI character overlay based on the various game sequences. It should be noted herein that the game slice may lock out certain game actions and graphics that are outside of the game slice and render the actual graphics and actions for the selected game slice. For instance, the game actions immediately preceding and immediately following the game slice are locked so that a user cannot access the game play beyond the game slice. The AI character overlay, thus, merely provides a passive overlay so as to provide realistic graphics during the play of the game slice. The selective locking of the game actions/graphics and providing access to the selected mini-game slice helps in saving system/network resources. It also helps in providing required access to the sample portions of the game without overwhelming the users with the complete game.

Game play of the game slice is recorded using the gameplay recorder and one or more of secondary video segments of the game slice are generated from the recording using the video segment generator 320. The generated secondary video segments are associated with the game slice. The secondary video segments are uploaded by the video segment generator 320 to the game database to enable sharing of the secondary video segments with other users of the game network and/or social network that are socially related to a user providing selection activity.

The loaded game code of the selected game slice allows the user to play the game slice, reply to a user post that was used to share the game slice, generate a post sharing the game slice at one or more social networks, and post game score for the selected game slice upon playing. In one embodiment, the game of the selected game slice also enables users to unlock additional portions of game code of the game to enable the users to play the unlocked additional portions of the game.

In one embodiment, the game code may provide selective access to the game slice by limiting the number of times the user can play the game slice before locking the user out. Alternately, in another embodiment, the game code may provide selective access to the game slice and provide users with an option to buy the game. For instance, the game code may allow users providing active selection activity at the initial image of the game, to play the selected game slice for a pre-defined number of times before the locking the users out. The game code, in this instance, may allow the users to post and share the game scores with other users in the game network and/or social network. Additionally, the game code may provide incentives for users by allowing them to play the game based on the amount of sharing initiated by the respective users. The incentives may be commensurate with the level of sharing and the incentives may include unlocking of additional portions of the game, free tokens, free plays, etc.

Figure 5:
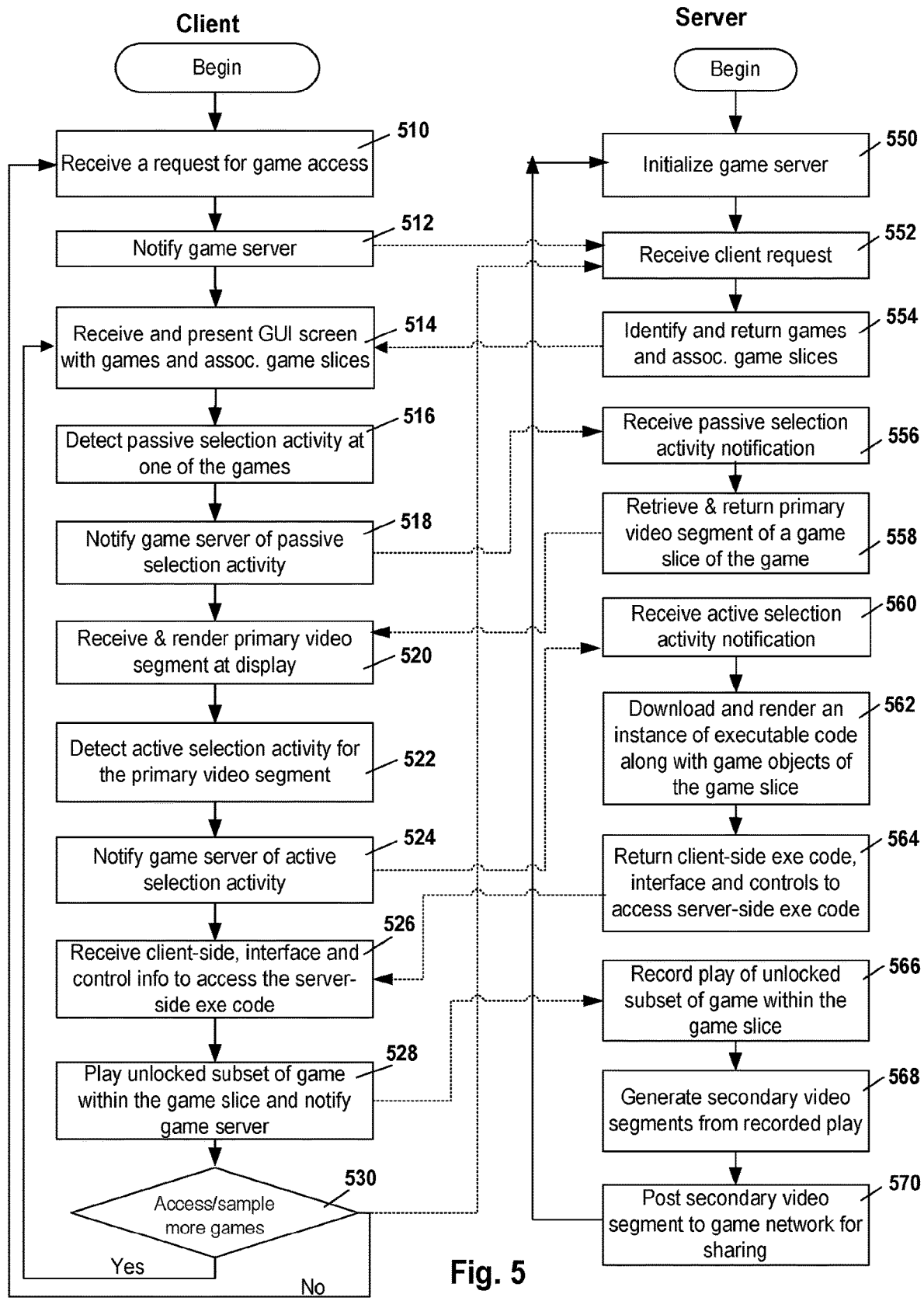
FIG. 5 illustrates a flow chart of operations of a method for processing and sharing game slices over a game network, in accordance with an embodiment of the invention.

With the detailed description of the various modules of the game server, a method for processing the game slices of an online game over a game network will now be described with reference to FIG. 5, in accordance with an embodiment of the invention. FIG. 5 illustrates the process and data flow of operations involved at both the client device side and the game server side. The method begins at operation 510 wherein a request for accessing games is initiated at a client device. In response to the request, a game access request notification is forwarded to the game server, as illustrated in operation 512. The game server performs initialization of the game server, as illustrated in operation 550, and is ready to service any requests originating from the client device.

In one embodiment, the game server may be a virtual machine that is part of a cloud system and configured to execute a game processor. The game server receives the request from the client, as illustrated in operation 552, uses the game manager within a game processor module 310 executing at the game server to query the appropriate databases, such as user database to obtain user preferences, game database to obtain game related information, a social database to obtain information related to social relevance of the games and/or game slices to a user and the popularity of the games/game slices within the social network of the user to identify the games and corresponding game slices, generate a graphical user interface (GUI) with the identified games and game slices and return the GUI to the client for rendering, as illustrated in operation 554. The game manager also identifies initial images for the games and/or the game slices and includes the initial images for the games and game slices in the GUI. The client device receives the GUI and renders the GUI at the display device of the client device, as illustrated in operation 514.

User activity at the GUI is monitored at the games and game slices rendered at the client device by a client-side code of the game processor. When a passive selection activity is detected proximate to an initial image of a game, as illustrated in operation 516, the client device notifies the passive selection activity to the game server requesting service of the passive selection activity, as illustrated in operation 518. The game server receives the notification of the passive selection activity, as illustrated in operation 556, and the activity selector module of the game processor 310 executing at the game server identifies a primary video segment for a game slice within the selected game. The primary video segment is retrieved and returned to the client device for rendering, as illustrated in operation 558.

The client device receives the primary video segment and renders the same at the display of the client device, as illustrated in operation 520. The primary video segment may be rendered as an overlay over the existing GUI, on a pop-up window or in a new window. In one embodiment, the primary video segment will continue to render so long as the passive selection activity is detected proximate to the initial image of the game. While the primary video segment is being rendered, further user activity is monitored at the GUI of the client device. When an active selection activity is detected at the GUI, as illustrated in operation 522, the game processor module 310 at the game server is notified of the active selection activity detected at the GUI, as illustrated in operation 524. The active selection activity may be detected at the primary video segment, proximate to the initial image of the game or proximate to the initial image of the game slice of the game whose primary video segment is currently rendering on the display.

The activity selector module of the game processor receives the notification from the client device, as illustrated in operation 560, and interacts with the game code mapper to identify executable code for the game slice associated with the primary video segment. The identified executable code includes a server-side code and the client-side interface. The server-side code is loaded to the game server and the client-side interface is returned to the client, as illustrated in operation 562. The loaded executable code at the game server includes game code and game objects/characters that are required to play the game defined within the game slice.

Additionally, the executable code may also include artificial intelligence (AI) character and graphic overlays provided by the AI character overlay module to provide a more realistic rendition of the game within the game slice. The client-side code includes interface and information defining controls to access the game slice for playing and for generating video segments. The server-side code detects the client device providing the selection activities, determines the type of the client device and retrieves pre-defined setup parameters for rendering on the display of the client device. The pre-defined setup parameters includes information used for defining the controls for playing the game slice at the client device. The client-side code including interface and control information is returned to the client device, as illustrated in operation 564.

The client device receives the client-side executable interface and control information and renders the same at the client device, as illustrated in operation 526. The rendered client-side executable interface and control information enables users to access and play an unlocked subset of the game defined within the game slice. Game play of the unlocked subset of the game is detected through user activities and interactions and such user activity and interactions are transmitted to the gameplay recorder of the game processor for processing, as illustrated in operation 528.

The gameplay recorder receives the activities and interactions in the form of recorded gameplay from different users, as illustrated in operation 566, and generates video segments for the unlocked subset of the game defined within the game slice using the recorded gameplay, as illustrated in operation 568. The gameplay recorder may interact with the video segment generator within the game processor to generate the video segments of the recorded gameplay. In one embodiment, the video segment generator may generate secondary video segments for the game slice using the recorded gameplay of the users accessing the game slice. In this embodiment, the game slice is already associated with a primary video segment.

The video segments generated by the video segment generator, in response to the play of the unlocked subset of the game defined within the game slice, are posted to the game network for sharing with other users of the game network or users of one or more social network associated with the users, as illustrated in operation 570. After playing the unlocked subset of the game within the game slice, a decision point 530 is reached, wherein user interactions are tracked to determine if additional games need to be accessed. If additional games need to be accessed within the GUI, the process flows back to operation 516 wherein passive selection activity is detected and the process of receiving access and playing the game slice within the game is performed. If additional game need not be accessed, the process flows back to operation 510 wherein the client device waits to receive a request for game access. The process continues till a time-out event occurs or till the user exits the game system.

Figure 6:
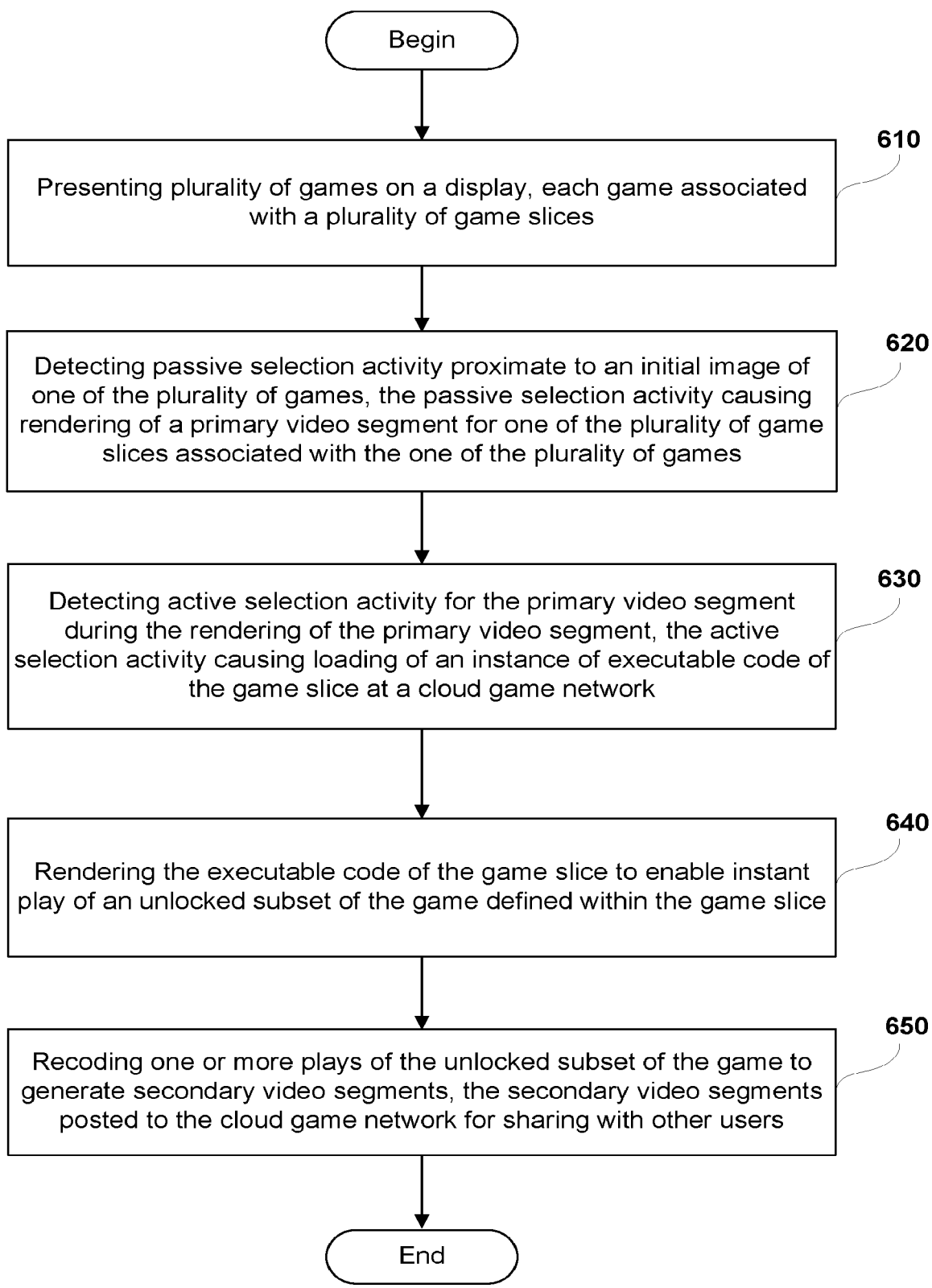
FIG. 6 illustrates a simplified flow chart of operations for a method for processing game slices over a cloud game network, in accordance with an embodiment of the invention.

FIG. 6 illustrates flow chart operation of an alternate method for processing game slices over a cloud game network, in another embodiment of the invention. The method begins at operation 610, wherein a plurality of games is retrieved and returned for rendering on a display of a client device, in response to a request for accessing games received from the client device. The games are presented on graphical user interface (GUI) at the client device. The games include a plurality of game slices. Each game slice is a portion of the game that is less than the entire part of the game and is defined by a user. Passive selection activity is detected proximate to an initial image of a selected one of the games at the GUI, as illustrated in operation 620. The passive selection activity causes the server to retrieve and present a primary video segment for one of the plurality of game slices associated with the selected game for rendering at the display of the client device. During the rendering of the primary video segment, active selection activity is detected for the primary video segment, as illustrated in operation 630.

The active selection activity may be detected at the primary video segment, at the selected game or proximate to the initial image of the game. In response to the active selection activity, an instance of an executable code of the game slice of the game is loaded onto the cloud game network. The executable code includes game code, game objects and other pertinent information required for playing the game. The executable code may also include pre-defined setup parameters for a particular type of client device. The pre-defined setup parameters provide information to define controls for playing the game defined within the game slice. The executable code is rendered to enable instant play of an unlocked subset of the selected game associated with the game slice, as illustrated in operation 640. The rendered executable code includes information defining the controls for playing the game defined within the game slice. The selected ones of the game slices are also configured for sharing with other users over a network, such as the cloud game network or a social network. The one or more plays of the unlocked subset of the game is recorded to generate one or more secondary video segments, as illustrated in operation 650. The secondary video segments are posted to the cloud game network to enable sharing with others users of a network. The network for sharing the secondary video segments may be the cloud game network, one or more social networks or combination thereof.

The presently described embodiments demonstrate how game slices of various games within a game server are processed for frictionless sharing with other socially relevant users within the game network and/or social network. The various embodiments provide ways to selectively lock the game actions/graphics for portions of the game outside the game slice while providing access to only the required portions of the game defined within the game slice thereby saving system/network resources. It also helps in providing required access to the sample portions of the game without overwhelming the users with the complete game.

The various embodiments, as described earlier, provides for frictionless access to a selected portion of the games without requiring a user to go through the process of signing up for the game, progress through setup processes, progress through various game levels, etc., and the buying process. The frictionless access provides users instant play access to the selected portion of the game and may inherit the set-up parameters defined by a user that generated the game slice or using pre-defined setup parameters reducing the latency that is typically associated with the game set-up.

While specific embodiments have been provided to demonstrate sharing of portions of a game with other users, these are described by way of example and not by way of limitation. Those skilled in the art having read the present disclosure will realize additional embodiments falling within the spirit and scope of the present invention.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multi-player video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing game content of a game, comprising:
   receiving a request from a first user to access a game cloud system;
   presenting a user interface to the first user to access a plurality of games configured for execution by the game cloud system;
   enabling game play of a first game, in response to selection of the first game for game play by the first user, and generating a recorded video of the game play for the first user;
   receiving a share request to share the recorded video of the game play of the first game, the share request enabling selection of a portion of the recorded video to identify a video clip of the recorded video for sharing;
   generating the video clip for the portion selected from the recorded video of the game play by the first user;
   generating an executable game slice corresponding to the video clip, for game play; and
   providing the video clip and a link to the executable game slice to a website, in response to the share request received from the first user.

2. The method of claim 1, wherein the share request is received from the first user during game play, the receiving of the share request causes pausing of the game play of the first game to allow selection of the portion of the recorded video for sharing.

3. The method of claim 1, wherein the share request is received from the first user upon ending of the game play of the first game, the receiving of the share request causes rendering of a second user interface with controls to enable selection of the portion of the recorded video for sharing.

4. The method of claim 1, wherein the game slice inherits setup parameters of the first game, the setup parameters are pre-defined or are defined by the first user.

5. The method of claim 1, wherein the game slice includes an unlocked subset of the first game for game play.

6. The method of claim 1, wherein enabling selection of the portion of the recorded video includes providing a second user interface with controls for identifying a starting point, or an ending point, or both the starting and ending points within the recorded video for generating the video clip.

7. The method of claim 1, wherein selection of the game slice for game play by a second user causes loading and executing executable code of the game slice, and
   wherein a client device used for game play of the game slice and a controller device used for providing game input are detected, in response to selection of the game slice for game play by the second user, such that game output generated for the game slice is interpreted in accordance to the game input provided by the controller device and a video recording of the game play of the game slice by the second user generated is configured for the client device.

8. The method of claim 7, wherein the client device and the controller device associated with the second user is obtained from user profile associated with the second user.

9. The method of claim 7, wherein loading the executable code includes loading one or more game attributes associated with the game slice, wherein the game attributes includes game characters, or graphic overlays, or game objects, or object states, or object attributes, or current state or any combinations thereof.

10. The method of claim 7, wherein the video recording of the game slice provided as a secondary video segment for the game slice, and wherein the video clip generated from the game play of the first user provided as a primary video segment for the game slice.

11. The method of claim 10, further includes enabling sharing of the secondary video segment for the game slice on the website, wherein the sharing of the secondary video segment includes providing an option for selecting the secondary video segment for viewing, when the game slice is selected.

12. The method of claim 1, further includes providing selectable options on the user interface for selecting a client device used for game play of the game slice, such that game output generated for the game slice is configured for the client device.

13. The method of claim 1, wherein the video clip generated from the game play of the first user is provided as a primary video segment, wherein providing the video clip includes providing an option at the website to view the primary video segment.

14. The method of claim 1, wherein method operations are performed by one or more game processing modules executing on a game server of the game cloud system.

* * * * *